United States Patent [19]

Nerowski et al.

[11] Patent Number: 4,890,181
[45] Date of Patent: Dec. 26, 1989

[54] SHORT-CIRCUIT PROTECTION DEVICE FOR AN ELECTRICAL MACHINE FED BY A PULSE-CONTROLLED A.C. CONVERTER

[75] Inventors: Georg Nerowski, Lauf; Bernhard Piepenbreier, Hemhofen; Hans-Juergen Toelle, Erlangen, all of Fed. Rep. of Germany

[73] Assignee: Siemens Aktiengesellschaft, Munich, Fed. Rep. of Germany

[21] Appl. No.: 320,394

[22] Filed: Mar. 8, 1989

[30] Foreign Application Priority Data

Mar. 18, 1988 [DE] Fed. Rep. of Germany ....... 3809203

[51] Int. Cl.$^4$ .............................................. H02H 7/08
[52] U.S. Cl. ........................................ 361/18; 361/20; 361/58; 361/93; 318/762; 363/56
[58] Field of Search ...................... 361/18, 20, 21, 58, 361/98, 101, 93, 56, 33; 318/762, 635; 363/56

[56] References Cited

U.S. PATENT DOCUMENTS

| | | | |
|---|---|---|---|
| 4,410,926 | 10/1983 | Hafner et al. | 361/91 |
| 4,410,935 | 10/1983 | Dang | 363/56 |
| 4,434,393 | 2/1984 | Kobari et al. | 318/762 |
| 4,521,724 | 6/1985 | Sakamato et al. | 318/762 |

Primary Examiner—Todd E. DeBoer
Attorney, Agent, or Firm—Kenyon & Kenyon

[57] ABSTRACT

A short-circuit protective device for a motor-driven and generator-driven electrical machine fed by a pulse-controlled a.c. converter has reverse-parallel circuitry that is switching dependent on a monitoring device. The monitoring device detects short circuits and is provided in a d.c. current supply line. Using the reverse-parallel circuitry and the monitor, an intermediate circuit capacitor of the pulse-controlled a.c. converter feeding the machine is isolated from the short circuit location.

2 Claims, 1 Drawing Sheet

SHORT-CIRCUIT PROTECTION DEVICE FOR AN ELECTRICAL MACHINE FED BY A PULSE-CONTROLLED A.C. CONVERTER

FIELD OF THE INVENTION

The present invention relates to short circuit protection devices for motor-driven generator-driven electrical machines that are fed by a pulse-controlled a.c. converter. The a.c. converter contains an intermediate circuit capacitor and recovery diodes.

BACKGROUND OF THE INVENTION

Machines that are operative in all four quadrants of the plane of speed of rotation-moment of rotation and that are switched off from the external power supply need to have short circuit protection, in the event a short circuit occurs in the d.c. current power supply. When fuses are used that blow as a result of a short circuit, they must be replaced, which is time-consuming. If instead of fuses, mechanical circuit components are used that have significant response delays, the short-circuit current can attain unacceptably high levels by the time the energy supply is interrupted.

A problem is to provide a safe short-circuit protection device with quick acting means that do not need to be replaced for electrical machines fed by a pulse-controlled a.c. converter. It is to be understood that such a pulse-controlled a.c. converter usually contains an intermediate circuit capacitor and recovery diodes, as well as individually controllable semiconductors.

SUMMARY OF THE INVENTION

The above problem is solved in the present invention by providing a short-circuit protection device for an electrical machine fed by a pulse-controlled a.c. converter coupled to the protection device. The protection device is coupled to a d.c. current power supply. The a.c. converter is operative in all four quadrants of a performance graph of speed of rotation-moment of rotation, and has an intermediate circuit capacitor and recovery diodes. The protection device comprises a poled protection diode that is permeable only to motor machine current from the d.c. current power supply. A controllable power semiconductor is permeable only to generator machine current from the machine, the poled protection diode and the controllable power semiconductor being arranged in at least one of the d.c. current supply lines. A short circuit detector is coupled to the controllable power semiconductor, which detects a short-circuit in the d.c. current power supply and isolates the intermediate circuit capacitor of the a.c. converter from the location of the short-circuit in the d.c. current supply line so that the voltage of the intermediate circuit capacitor can prevent a machine short-circuit current in the recovery diodes of the a.c. converter.

In the present invention, transistors, GTOs or similarly acting electronic circuit components serve as switchable, reverse-parallel power semiconductors. These power semiconductors are arranged to be switching dependent on an electronic monitoring device. The monitor can monitor, for example, the $V_{CE}$ of a transistor. The monitoring device is coupled electrically to at least one of the d.c. current supply lines, so that it can detect a short circuit on the injection side.

To prevent line switching surges, an auxiliary diode, through which normally no current flows, is coupled between the two d.c. current supply lines before the reverse-parallel circuitry.

DETAILED DESCRIPTION

An electrical machine M that is operative in all quadrants of the plane of speed of rotation - moment of rotation is shown coupled in the bridge arm of a pulse-controlled a.c. converter UR. The bridge arm has four controllable semiconductors H and four recovery diodes D assigned to these semiconductors H. The bridge arm also has a common intermediate circuit capacitor C. This configuration is coupled to a d.c. current power supply (not shown here) through d.c. current supply lines L+ and L−.

In one of the d.c. current supply lines (L+), a poled protective diode DS is arranged before the pulse-controlled a c converter UR, along with the intermediate circuit capacitor C. This poled protection diode DS is permeable to motor machine current during motorized operation of machine M, and is bridged by a controllable power semiconductor HS with an opposite direction of current passage (reverse-parallel circuitry). This controllable power semiconductor HS is permeable only to generator machine current from machine M. Thus, a motor current as well as a generator current can flow when efficient d.c. current power is supplied.

Without the short-circuit protection device of the present invention, if a short circuit occurs in the d.c. current power supply before the reverse-parallel circuitry, then the intermediate circuit capacitor C would discharge at the short-circuit location between L+ and L−. A machine short-circuit current could therefore develop in the recovery diodes D as a result of the then reduced tension in the capacitor voltage.

To provide short-circuit protection, the invention uses a quick-releasing monitoring device EW for the power monitoring devices EW are commercially available. The monitoring device EW is coupled to the d.c. current supply line L+ in the area of the reverse-parallel circuitry and recognizes a short circuit in the d.c. current power supply. The monitor EW recognizes the short-circuit by monitoring $V_{CE}$ voltage of the power semiconductor HS. If a short circuit occurs in the d.c. current power supply, the monitoring device EW issues an inhibit signal to the power semiconductor HS, before the short-circuit current rises to a dangerous level. A considerable discharge from the intermediate circuit capacitor C and, therefore, a machine short-circuit current is thereby prevented.

Figure 2:
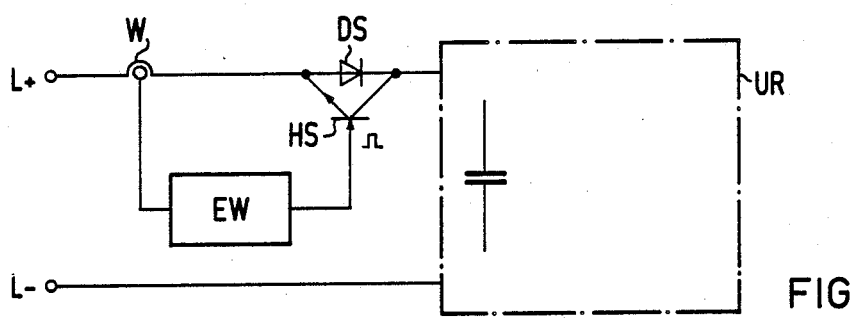
FIG. 2 shows another embodiment of the present invention.
Figure 3:
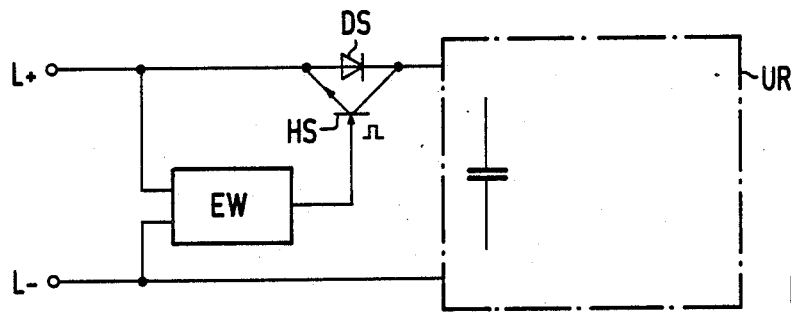
FIG. 3 shows another embodiment of the present invention.

In the embodiment of FIG. 2, the monitoring device EW is coupled by a current transformer W to a d.c. current supply line and separately coupled to the power semiconductor HS. In the embodiment of FIG. 3, the monitoring device EW is shown directly coupled between both d.c. current supply lines.

Figure 1:
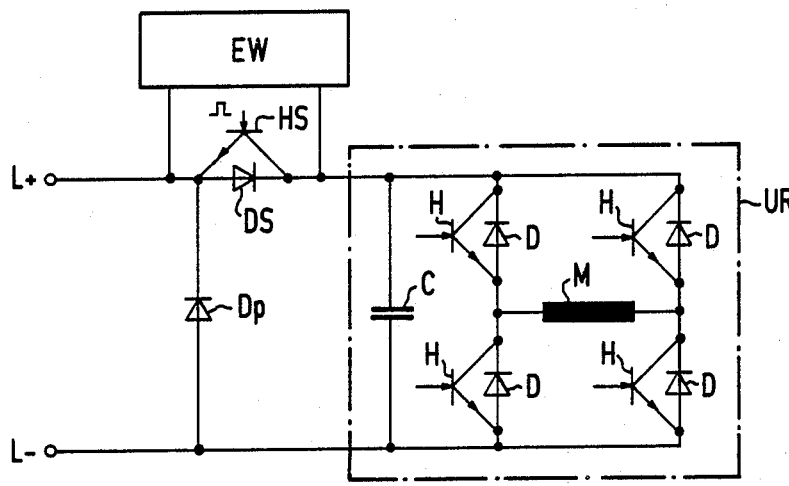
FIG. 1 shows a schematic diagram of a short circuit protection device constructed in accordance with an embodiment of the present invention.

To avoid line switching surges on the power semiconductor HS as a result of rapid current variations due to line inductance in the d.c. current power supply, a diode Dp can be provided between the d.c. current supply lines L+ and L− in conjunction with the reverse-parallel circuitry HS, DS. This is shown in FIG. 1.

What is claimed:

1. A short-circuit protection device for an electrical machine fed by a pulse-controlled a.c. converter coupled to d.c. current supply lines to a d.c. current power supply, the a.c. converter being operative in all four quadrants of a performance graph of speed of rotation - moment of rotation, said a.c. converter having an intermediate circuit capacitor and recovery diodes, said protection device comprising:

a poled protection diode that is permeable only to motor machine current from the d.c. current power supply;

a controllable power semiconductor, permeable only to generator machine current from the machine, said poled protection diode and said controllable power semiconductor being arranged in at least one of said d.c. current supply lines; and a short-circuit detector coupled to said controllable power semiconductor which detects a short circuit in the d.c. current power supply and controls a switching off of said controllable power semiconductor, whereby the intermediate circuit capacitor of the a.c. converter is isolated from the location of the short-circuit in the d.c current supply line and the voltage of said intermediate circuit capacitor prevents a machine short-circuit current in the recovery diodes of the a.c. converter.

2. The short-circuit protection device of claim 1, further comprising an auxiliary diode coupled between the d.c. current supply lines.

* * * * *

UNITED STATES PATENT AND TRADEMARK OFFICE
CERTIFICATE OF CORRECTION

PATENT NO. : 4,890,181

DATED : 26 December 1989

INVENTOR(S) : G. NEROWSKI et al.

It is certified that error appears in the above-identified patent and that said Letters Patent is hereby corrected as shown below:

| Column | Line | |
|---|---|---|
| 3 | 7 | Before "d.c. current" (first occurrence) insert --said protection device, the protection device being coupled by--. |

Signed and Sealed this

Fifth Day of May, 1992

Attest:

DOUGLAS B. COMER

*Attesting Officer*     *Acting Commissioner of Patents and Trademarks*